Patented June 25, 1940

2,205,660

UNITED STATES PATENT OFFICE 2,205,660

PROCESS FOR THE PRODUCTION OF MAGNESIUM

Roy C. Kirk, Midland, Mich., assignor to The Dow Chemical Company, Midland, Mich., a corporation of Michigan No Drawing. Application September 29, 1939, Serial No. 297,112

6 Claims. (Cl. 75—67)

This invention relates to an improved process for the production of magnesium by the thermal reduction of magnesia-containing materials with carbonaceous reducing agents.

It is known to prepare metallic magnesium by heating magnesia-containing ores with carbonaceous reducing agents at elevated temperatures. In the process, magnesium is liberated as a vapor which may be withdrawn from the reduction zone and condensed.

It has now been found that this reduction process is catalyzed by the presence of a mixture of chromic oxide ($Cr_2O_3$) and at least one of the oxides, lime and silica. That is, the presence of this oxide mixture greatly increases the rate of evolution of magnesium vapors, thereby permitting a much higher percentage recovery of the magnesium in the ore charge within a reasonable length of time and correspondingly reducing heating costs in the process.

In practice the magnesia-containing ore, carbonaceous reducing agent, and mixture of chromic oxide with lime or silica are heated together at a temperature sufficient to liberate the magnesium vapor, usually at 1400° C. or higher, and at atmospheric or reduced pressure, preferably at a pressure below 25 millimeters of mercury absolute. The liberated vapor is then withdrawn and condensed to metallic magnesium.

Any magnesia-containing ore, such as calcined magnesite, calcined dolomite, calcined brucite, etc., may be employed in the process, and likewise any carbonaceous reducing agent, such as coke, graphite, or charcoal. The reducing agent is ordinarily employed in a quantity at least equivalent to the magnesia in the ore, and preferably in an amount somewhat in excess of this value, since there is a slight interaction of the chromic oxide and the carbon. The reduction charge may advantageously be formed into briquettes prior to the heating operation.

In the process of the invention, the oxide catalysts may be employed in widely varying proportions. However, the chromic oxide is usually employed in a proportion between about 2 and 25 per cent by weight of the total reduction charge, preferably 4 to 10 per cent. It may be added as such or in the form of a naturally occurring ore, such as chromite. The lime, when used in combination with the chromic oxide, is ordinarily used in a quantity equivalent to between about 5 and about 60 per cent by weight of the total charge; it may be added as such or may occur naturally in the magnesia-containing ore as in calcined dolomite. Silica is usually employed in a quantity between about 5 and about 35 per cent by weight of the total charge, preferably 10 to 20 per cent. The silica may be added as such or in the form of certain silicates or may occur naturally in the magnesia-containing ore.

The following examples will illustrate the invention but are not to be construed as limiting its scope.

Example 1

A mixture of 300 parts by weight of finely-divided magnesia, 127 parts of graphite powder, 53 parts of chromic oxide, and 400 parts of lime was formed into briquettes using a tar binder. The briquettes were then heated to carbonize the tarry binder and further heated in a furnace maintained at a temperature of 1500° C. at an absolute pressure of 5–10 millimeters mercury for a 2-hour period. Magnesium vapors were liberated at a rapid rate and were removed from the furnace and condensed. A net yield of 66.3 per cent of the theoretical quantity of magnesium metal was obtained. When the experiment was repeated exactly with the exception that the chromic oxide and lime were omitted from the charge, the yield of magnesium was only 32.2 per cent.

Example 2

A mixture of 300 parts by weight of magnesia, 127 parts of graphite, 31 parts of chromic oxide, and 51 parts of silica was heated as in Example 1. The yield of magnesium was 56.2 per cent of the theoretical.

Example 3

A mixture of 300 parts by weight of magnesia, 127 parts of graphite, 59 parts of chromic oxide, 400 parts of lime, and 98 parts of silica was heated according to the procedure of Example 1. The magnesium yield was 47.5 per cent.

It is to be understood that the foregoing description is illustrative rather than strictly limitative, and that the invention is co-extensive in scope with the following claims.

The invention claimed is:

1. In a process for the production of magnesium by the thermal reduction of magnesia-containing material by the presence of a carbonaceous reducing agent, the improvement which comprises carrying out the reduction in the presence of chromic oxide and at least one of the oxides lime and silica.

2. In a process for the production of magnesium by the thermal reduction of magnesia-containing material by the presence of a carbonaceous reducing agent, the improvement which comprises carrying out the reduction in the presence of chromic oxide in a proportion of between about 2 and 25 per cent by weight of the total charge, and at least one of the oxides lime and silica.

3. In a process for producing magnesium, the steps which include heating a charge comprising a magnesia-containing ore, a carbonaceous reducing agent in a proportion at least equivalent to the magnesia, chromic oxide in the proportion of between about 2 and about 25 per cent by weight of the total charge, and at least one of the oxides silica and lime to a temperature sufficient to liberate the magnesium as a vapor, and withdrawing the said vapor and condensing it.

4. In a process for producing magnesium, the steps which include heating a charge comprising a magnesia-containing ore, a carbonaceous reducing agent in a proportion at least equivalent to the magnesia, chromic oxide in proportion between about 2 and about 25 per cent by weight of the charge, and lime in a proportion between 5 and about 60 per cent by weight of the charge, at a temperature of at least 1400° C., to liberate magnesium as a vapor and condensing the vapor.

5. In a process for producing magnesium, the steps which include heating a charge comprising a magnesia-containing ore, a carbonaceous reducing agent in a proportion at least equivalent to the magnesia, chromic oxide in proportion between about 2 and about 25 per cent by weight of the charge, and silica in a proportion between about 5 and about 35 per cent by weight of the total charge, at a temperature of at least 1400° C., to liberate magnesium as a vapor, and condensing the vapor.

6. In a process for producing magnesium, the steps which include heating a charge comprising a magnesia-containing ore, a carbonaceous reducing agent in a proportion greater than that equivalent to that of the magnesia, chromic oxide in a proportion between about 4 and about 10 per cent by weight of the total charge, and at least one of the oxides silica and lime at a temperature of at least 1400° C. and at an absolute pressure below 25 millimeters of mercury, to liberate magnesium as a vapor, and withdrawing the said vapor and condensing the vapor.

ROY C. KIRK.